(12) United States Patent
Ota

(10) Patent No.: US 12,429,732 B2
(45) Date of Patent: Sep. 30, 2025

(54) DISPLAY DEVICE

(71) Applicant: Magnolia White Corporation, Tokyo (JP)

(72) Inventor: Takashi Ota, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/659,159

(22) Filed: May 9, 2024

(65) Prior Publication Data

US 2024/0402538 A1     Dec. 5, 2024

(30) Foreign Application Priority Data

May 31, 2023    (JP) ................................ 2023-089958

(51) Int. Cl.
     *G02F 1/13357*      (2006.01)
     *F21V 8/00*      (2006.01)

(52) U.S. Cl.
     CPC ..... *G02F 1/133621* (2013.01); *G02B 6/0068* (2013.01); *G02B 6/0073* (2013.01); *G02B 6/0076* (2013.01); *G02B 6/0091* (2013.01); *G02F 1/133615* (2013.01)

(58) Field of Classification Search
     CPC .. G02B 6/0068; G02B 6/0073; G02B 6/0076; G02B 6/0091
     See application file for complete search history.

(56) References Cited

U.S. PATENT DOCUMENTS

| | | | |
|---|---|---|---|
| 2005/0201120 A1* | 9/2005 | Nesterenko | G02B 6/0046 362/613 |
| 2008/0025043 A1* | 1/2008 | Lee | G02B 6/0048 362/608 |
| 2008/0232133 A1* | 9/2008 | Segawa | G02B 6/002 362/610 |
| 2015/0002783 A1* | 1/2015 | Park | G02B 6/0076 349/64 |
| 2015/0235598 A1* | 8/2015 | Liao | G02B 6/0083 362/613 |
| 2016/0139323 A1* | 5/2016 | Remhof | G02B 6/0048 362/609 |

(Continued)

FOREIGN PATENT DOCUMENTS

| | | |
|---|---|---|
| JP | 2008-210758 A | 9/2008 |
| JP | 2009-259557 A | 11/2009 |
| JP | 2017-215510 A | 12/2017 |

*Primary Examiner* — Zheng Song
(74) *Attorney, Agent, or Firm* — XSENSUS LLP

(57) ABSTRACT

A display device includes: point light sources emitting light of different colors; light guides each of which includes an end face facing a corresponding one of the point light sources, a first surface connected to the end face, and a second surface diagonally facing the end face and the first surface, the light being incident on the end face and undergoing internal reflection, between the first and second surfaces, and linear pattern emission from the first surface; and a display panel including a side surface that faces the first surface and on which the light is incident, front and back surfaces, and a converter that changes a traveling direction of the light, for each pixel of the image, propagating away from the side surface internally between the front and back surfaces, to a direction toward the display surface.

10 Claims, 9 Drawing Sheets

(56) References Cited

U.S. PATENT DOCUMENTS

2017/0153376 A1\* 6/2017 Onoda ................ G02B 6/0068
2017/0352329 A1   12/2017 Imai
2019/0179076 A9\* 6/2019 Woodgate ......... G02F 1/133524

\* cited by examiner

DISPLAY DEVICE

CROSS-REFERENCE TO RELATED APPLICATION

The present application claims priority from Japanese patent application JP2023-089958 filed on May 31, 2023, the contents of which are hereby incorporated by reference into this application.

BACKGROUND

1. Field

The present disclosure relates to a display device.

2. Description of the Related Art

There is a display device that introduces light through a side surface of a display panel (JP2017-215510A). Full-color display without use of a color filter can be achieved by introducing light of the three primary colors individually and employing a field sequential method.

For introducing the light through the side surface of the display panel, a surface light source cannot be used (JP2008-210758A). For introducing the light individually for each of the three primary colors, a white linear light source cannot be used (JP2009-259557A). Point light sources of different colors arranged in a row, when they emit light for each color, cannot emit light in a linear pattern because of gaps between the point light sources of the same color.

SUMMARY

This disclosure aims to enable light of multiple colors, emitted in a linear pattern, to be incident on a side surface of a display panel for each color.

A display device includes: point light sources emitting light of different colors from each other; light guides, each of the light guides including an end face facing a corresponding one of the point light sources, each of the light guides including a first surface connected to the end face, each of the light guides including a second surface diagonally facing the end face and the first surface, the light being incident on the end face and undergoing internal reflection, between the first surface and the second surface, and linear pattern emission from the first surface; and a display panel including a side surface that faces the first surface and on which the light is incident, the display panel including a front surface and a back surface, at least one of the front surface or the back surface being a display surface of an image, the display panel including a converter that changes a traveling direction of the light, for each pixel of the image, propagating away from the side surface internally between the front surface and the back surface, to a direction toward the display surface.

DETAILED DESCRIPTION

Figure 1:
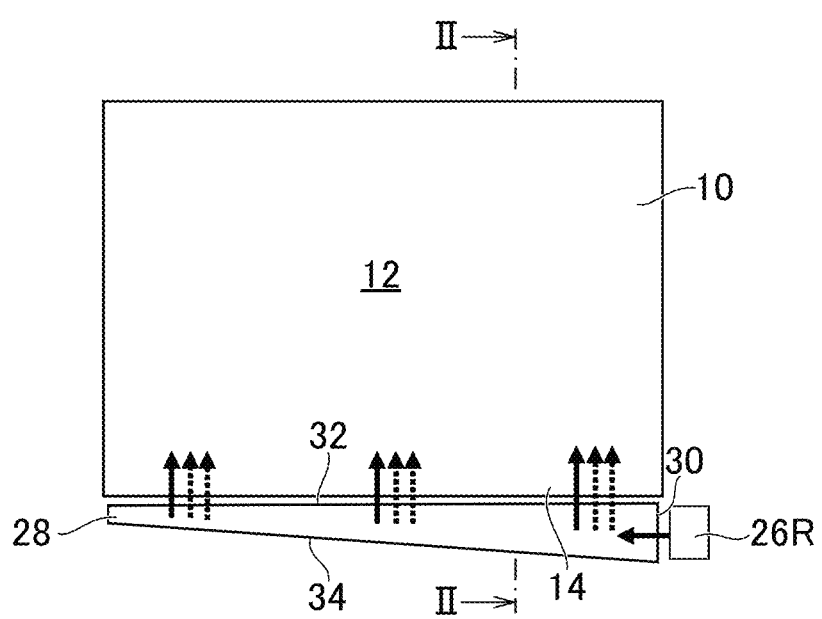
FIG. 1 is a front view of a display device according to a first embodiment.

Hereinafter, some embodiments will be described with reference to the drawings. Here, the invention can be embodied according to various aspects within the scope of the invention without departing from the gist of the invention and is not construed as being limited to the content described in the embodiments exemplified below.

The drawings are further schematically illustrated in widths, thickness, shapes, and the like of units than actual forms to further clarify description in some cases but are merely examples and do not limit interpretation of the invention. In the present specification and the drawings, the same reference numerals are given to elements having the same functions described in the previously described drawings, and the repeated description will be omitted.

Further, in the detailed description, "on" or "under" in definition of positional relations of certain constituents, and other constituents includes not only a case in which a constituent is located just on or just under a certain constituent but also a case in which another constituent is interposed between constituents unless otherwise mentioned.

First Embodiment

Figure 2:
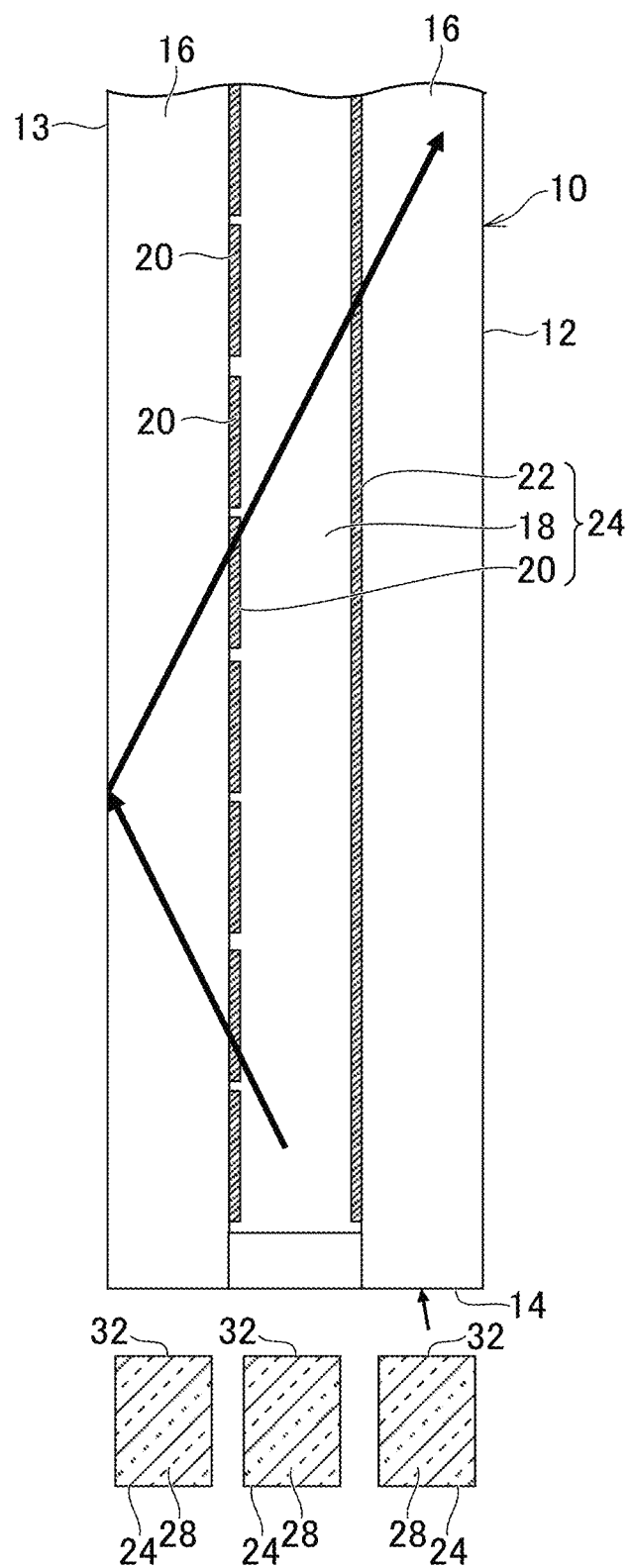
FIG. 2 is a II-II cross-sectional view of the display device in FIG. 1.

FIG. 1 is a front view of a display device according to a first embodiment. FIG. 2 is a II-II cross-sectional view of the display device in FIG. 1. The display device includes a display panel 10 (e.g., liquid crystal display panel). The display panel 10 includes a front surface 12 and a back surface 13. At least one (for example, both) of the front surface 12 or the back surface 13 is a display surface of an image. The display panel 10 includes a side surface 14 on which light can be incident.

As shown in FIG. 2, the display panel 10 includes a pair of transparent substrates 16. A polymer-dispersed liquid crystal layer 18 is interposed between the pair of transparent substrates 16. The liquid crystal layer 18 is located between pixel electrodes 20 and a common electrode 22. The pixel electrodes 20 and the common electrode 22 are transparent. When no voltage is applied between the pixel electrodes 20 and the common electrode 22, light travels straight through the liquid crystal layer 18 without changing the traveling direction of light.

Figure 3:
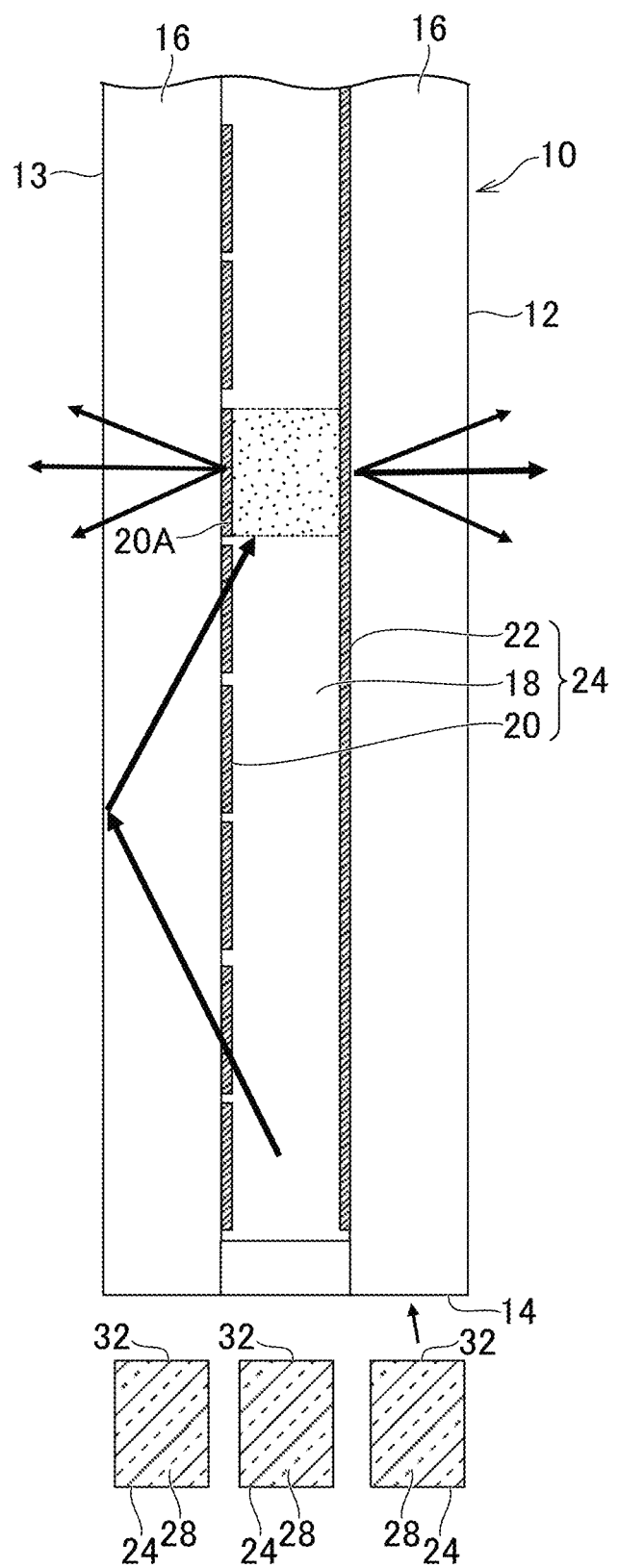
FIG. 3 is a cross-sectional view of the display device during operation.

FIG. 3 is a cross-sectional view of the display device during operation. A voltage is applied between the pixel electrode 20A and the common electrode 22, whereby light is scattered in the liquid crystal layer 18. Thus, the traveling direction of light is converted, for each pixel of the image, to the direction toward the display surface (at least one of the front surface 12 or the back surface 13). The liquid crystal layer 18, the pixel electrodes 20, and the common electrode 22 constitute a converter 24. The display panel 10 includes the converter 24. The converter 24 can convert the traveling direction of light, for each pixel of the image, propagating away from the side surface 14 internally between the front surface 12 and the back surface 13 to the direction toward the display surface (at least one of the front surface 12 or the back surface 13).

Figure 4:
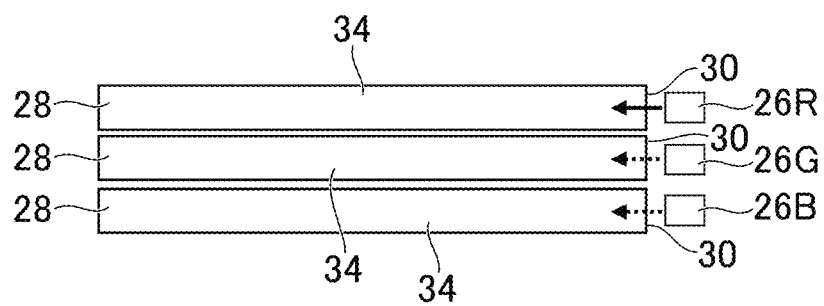
FIG. 4 is a bottom view of the display device in FIG. 1.

FIG. 4 is a bottom view of the display device in FIG. 1. The display device includes point light sources 26R, 26G, 26B (e.g., light-emitting diodes). The point light sources 26R, 26G, 26B can emit light of different colors from each other. The point light sources 26R, 26G, 26B overlap along the thickness (direction between the front surface 12 and the back surface 13) of the display panel 10.

The display device includes light guides 28. Each light guide 28 includes an end face 30 that faces a corresponding one of the point light sources 26R, 26G, 26B. The light guide 28 includes a first surface 32 connected to the end face 30. The light guide 28 includes a second surface 34 diagonally facing the end face 30 and the first surface 32. The light is incident on the end face 30 and undergoes internal reflection within the light guide 28 between the first surface 32 and the second surface 34, and linear pattern emission from the first surface 32. The side surface 14 of the display panel 10 faces the first surface 32, enabling light to be incident on it.

The end face 30 of each light guide 28 is parallel and adjacent to the end face 30 of another light guide 28. The first surface 32 of each light guide 28 is parallel and adjacent to the first surface 32 of another light guide 28. The second surface 34 of each light guide 28 is parallel and adjacent to the second surface 34 of another light guide 28.

The light guides 28 are separated from each other. The light guides 28 overlap along the thickness of the display panel 10. The light guides 28 are set in an arrangement maintaining gaps between adjacent ones of the light guides 28. The sum of the thicknesses of the light guides 28 and the gaps is within (for example, equivalent to) the thickness of the display panel 10.

The present embodiment enables light of multiple colors, from the point light sources 26R, 26G, 26B, to be incident on the light guides 28 for each color, and enables linearly emitted light of multiple colors to be incident, separately for each color, on the side surface 14 of the display panel 10.

Figure 5A:
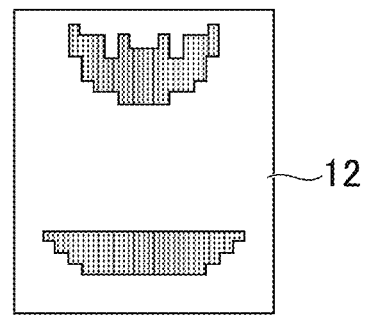
FIG. 5A is an explanatory diagram of a generating method of a color image.
Figure 5B:
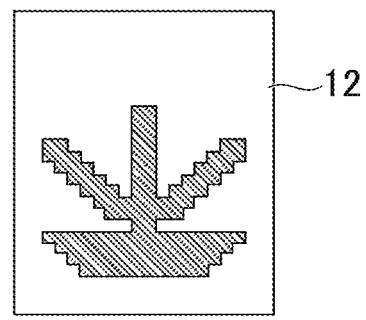
FIG. 5B is an explanatory diagram of the generating method of the color image.
Figure 5C:
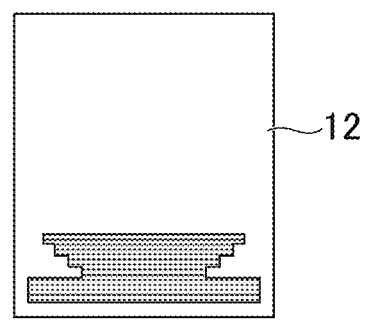
FIG. 5C is an explanatory diagram of the generating method of the color image.
Figure 5D:
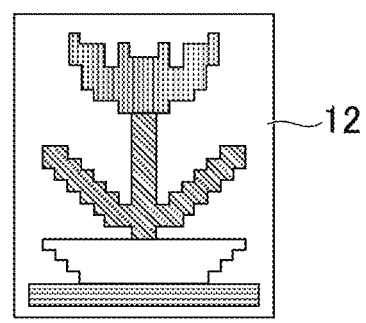
FIG. 5D is an explanatory diagram of the generating method of the color image.

FIGS. 5A to 5D are explanatory diagrams of a generating method of a color image. In this embodiment, multiple monochromatic images of different colors are displayed in a time-division manner using a field sequential method. For example, a red image in FIG. 5A, a green image in FIG. 5B, and a blue image in FIG. 5C are displayed in sequence. This results in a full-color image shown in FIG. 5D being visually recognizable due to afterimages of the multiple images. Overlapping areas of red, green, and blue images become white.

Second Embodiment

Figure 6:
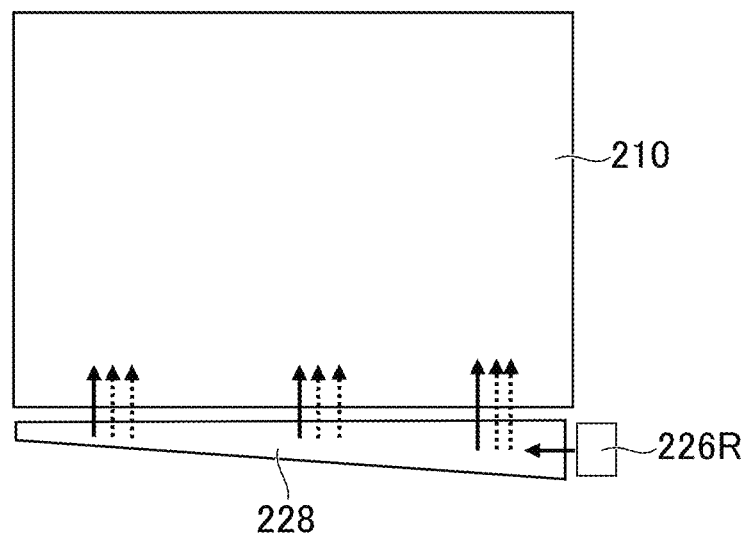
FIG. 6 is a front view of a display device according to a second embodiment.
Figure 7:
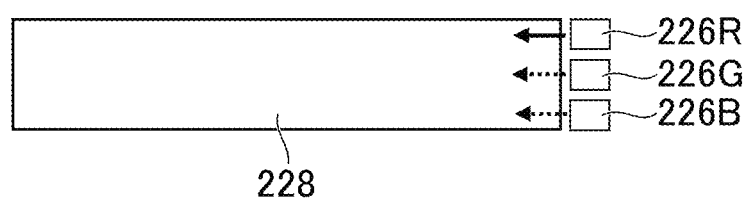
FIG. 7 is a bottom view of the display device in FIG. 6.

FIG. 6 is a front view of a display device according to a second embodiment. FIG. 7 is a bottom view of the display device in FIG. 6. This embodiment differs from the first embodiment in that light guides are an integrated entity and constitute a single light guide 228. Light of multiple colors from the respective point light sources 226R, 226G, 226B is incident on the light guide 228. The thickness of the single light guide 228 is within (for example, equivalent to) the thickness of the display panel 210. The contents described in the first embodiment are applicable to other aspects.

Third Embodiment

Figure 8:
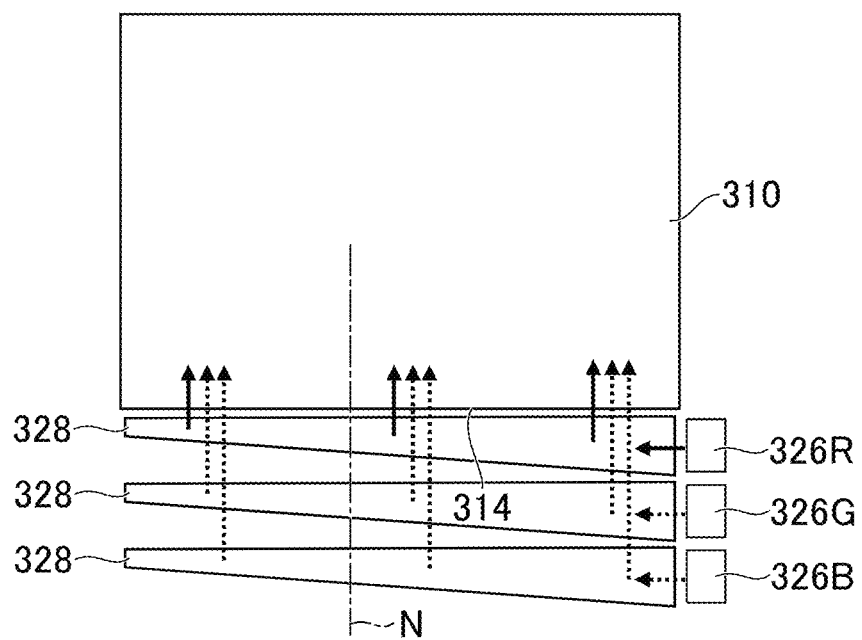
FIG. 8 is a front view of a display device according to a third embodiment.
Figure 9:
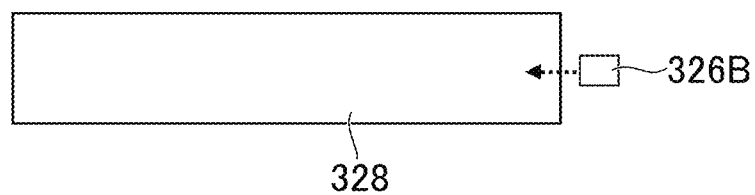
FIG. 9 is a bottom view of the display device in FIG. 8.

FIG. 8 is a front view of a display device according to a third embodiment. FIG. 9 is a bottom view of the display device in FIG. 8. The point light sources 326R, 326G, 326B overlap along the normal line N to the side surface 314 of the display panel 310. The light guides 328 overlap along the normal line N to the side surface 314 of the display panel 310. The thickness of each light guide 328 is within (for example, equivalent to) the thickness of the display panel 310. The contents described in the first embodiment are applicable to other aspects.

Outline of Embodiments (1) A display device including:
point light sources 26R, 26G, 26B emitting light of different colors from each other; light guides 28, each of the light guides 28 including an end face 30 facing a corresponding one of the point light sources 26R, 26G, 26B, each of the light guides 28 including a first surface 32 connected to the end face 30, each of the light guides 28 including a second surface 34 diagonally facing the end face 30 and the first surface 32, the light being incident on the end face 30 and undergoing internal reflection, between the first surface 32 and the second surface 34, and linear pattern emission from the first surface 32; and a display panel 10 including a side surface 14 that faces the first surface 32 and on which the light is incident, the display panel 10 including a front surface 12 and a back surface 13, at least one of the front surface 12 or the back surface 13 being a display surface of an image, the display panel 10 including a converter 24 that changes a traveling direction of the light, for each pixel of the image, propagating away from the side surface 14 internally between the front surface 12 and the back surface 13, to a direction toward the display surface.

(2) The display device according to (1), wherein the point light sources 26R, 26G, 26B overlap along a thickness of the display panel 10.

(3) The display device according to (2), wherein the light guides 28 overlap along the thickness of the display panel 10.

(4) The display device according to (3), wherein the light guides 28 are separated from each other.

(5) The display device according to (4), wherein the light guides 28 are set in an arrangement maintaining gaps between adjacent ones of the light guides 28, and a sum of thicknesses of the light guides 28 and the gaps is within the thickness of the display panel 10.

(6) The display device according to (3), wherein the light guides are an integrated entity and constitute a single light guide 228.

(7) The display device according to (6), wherein a thickness of the single light guide 228 is within the thickness of the display panel 210.

(8) The display device according to (1), wherein the point light sources 326R, 326G, 326B overlap along a normal line N to the side surface 314 of the display panel 310.

(9) The display device according to (8), wherein the light guides 328 overlap along the normal line N to the side surface 314 of the display panel 310.

(10) The display device according to (9), wherein a thickness of each of the light guides 328 is within the thickness of the display panel 310.

The embodiments described above are not limited and different variations are possible. The structures explained in the embodiments may be replaced with substantially the same structures and other structures that can achieve the same effect or the same objective.

What is claimed is:

1. A display device comprising:
   point light sources emitting light of different colors from each other;
   light guides, each of the light guides including an end face facing a corresponding one of the point light sources, each of the light guides including a first surface connected to the end face, each of the light guides including a second surface diagonally facing the end face and the first surface, the light being incident on the end face and undergoing internal reflection between the first surface and the second surface, and linear pattern emission from the first surface; and
   a display panel including a side surface, a front surface and a back surface,
   wherein
   the side surface of the display panel faces the first surface,
   the light from the light guides is incident on the side surface of the display panel,
   both the front surface and the back surface are display surfaces of an image,
   the display panel includes:
   a first transparent substrate having a plurality of pixel electrodes;
   a second transparent substrate having a common electrode overlapping with the plurality of the pixel electrodes; and
   a polymer-dispersed liquid crystal layer arranged between the first transparent substrate and the second transparent substrate, and
   the plurality of pixel electrodes, the common electrode and the polymer dispersed liquid crystal layer constitute a converter that changes a traveling direction of the light, for each pixel of the image, propagating away from the side surface internally between the front surface and the back surface, to a direction toward the display surfaces.

2. The display device according to claim 1, wherein the point light sources overlap along a thickness of the display panel.

3. The display device according to claim 2, wherein the light guides overlap along the thickness of the display panel.

4. The display device according to claim 3, wherein the light guides are separated from each other.

5. The display device according to claim 4, wherein
   the light guides are set in an arrangement maintaining gaps between adjacent ones of the light guides, and
   a sum of thicknesses of the light guides and the gaps is within the thickness of the display panel.

6. The display device according to claim 3, wherein the light guides are an integrated entity and constitute a single light guide.

7. The display device according to claim 6, wherein a thickness of the single light guide is within the thickness of the display panel.

8. The display device according to claim 1, wherein the point light sources overlap along a normal line to the side surface of the display panel.

9. The display device according to claim 8, wherein the light guides overlap along the normal line to the side surface of the display panel.

10. The display device according to claim 9, wherein a thickness of each of the light guides is within the thickness of the display panel.

* * * * *